United States Patent [19]
Tang

[11] Patent Number: 4,786,069
[45] Date of Patent: Nov. 22, 1988

[54] UNICYCLE

[76] Inventor: Chun-Yi Tang, 12 Diamond S. Ranch, Bellevue, Wash. 98008

[21] Appl. No.: 12,722

[22] Filed: Feb. 9, 1987

Related U.S. Application Data

[63] Continuation-in-part of Ser. No. 879,985, Jul. 30, 1986, and a continuation-in-part of Ser. No. 941,829, Dec. 15, 1986.

[51] Int. Cl.$^4$ .................................... B62K 1/00
[52] U.S. Cl. .................... 280/221; 74/594.1; 74/594.4; 272/73; 272/114; 280/11.115
[58] Field of Search .................. 280/205, 221, 11.115; 74/594.1, 594.4; 272/73, 114

[56] References Cited

U.S. PATENT DOCUMENTS 3,190,675 6/1965 Tang .................................. 280/221
3,506,283 4/1970 Tang .................................. 280/221

FOREIGN PATENT DOCUMENTS

1059390 2/1967 United Kingdom ................ 280/221

Primary Examiner—John J. Love
Assistant Examiner—Mitchell S. Hill
Attorney, Agent, or Firm—Delbert J. Barnard

[57] ABSTRACT

Tubular spacers (28) are positioned between the wheels (10, 12) of a unicycle. Inboard portions of tie bolts (34) extend through the spacers (28). A threaded end portion (38) of the tie bolt (34) screws into a T-nut (40) provided within an opening (26) in a wheel (12). The shaft of the tie bolt (34) projects through an opening (24) in the other wheel (10) and projects outwardly beyond the wheel (10). A second tubular spacer (50) closely surrounds the outboard portion of the tie bolt (34). At one end (52) this spacer bears against an abutment (46). At its opposite end (54) it abuts against the inner surface of the tie bolt head (36). When the tie bolt (34) is tightly screwed into the T-nut (46), it is put into tension and the tubular spacers (28, 50) are put into compression. A pedal element (56) is mounted for rotation about the outboard tubular spacer (50).

9 Claims, 9 Drawing Sheets

UNICYCLE

RELATED APPLICATION

This is a continuation-in-part of my copending application Ser. No. 879,985, filed July 30, 1986, and entitled UNICYCLE, and also of my copending application Ser. No. 941,829, filed Dec. 15, 1986, and entitled UNICYCLE.

TECHNICAL FIELD

This invention relates to unicycles. More particularly, it relates to the provision of an improved construction of a unicycle, characterized by a relatively small number of parts, several of which perform dual functions, and a substantial reduction in manufacturing cost.

BACKGROUND ART

My efforts to develop a unicycle started many years ago. My first attempts are disclosed in my U.S. Pat. No. 3,190,675. Thereafter, I attempted to market a unicycle that had a pair of disk wheels spaced apart by wooden blocks. These unicycles had wheel assemblies comprising a conventional bicycle pedal to which a bolt was welded at its mounting end. This bolt was inserted through openings in the wheels, adjacent the wooden blocks. A nut was applied to the threaded end of the bolt, outwardly of the wheel opposite the pedal. Attempts were made to market this type of unicycle several years ago. However, such attempts were unsuccessful because the manner of constructing the wheel assembly and connecting the two wheels together was not workable. The pedals would break away where they were welded to the bolts. Or, severe bending would occur in the region where the pedals were welded to the bolts. Also, the threaded connections at the end of the bolt kept coming loose. As a result of these failures, the commercial efforts to market the unicycle were unsuccessful.

On Apr. 14, 1970, I obtained U.S. Pat. No. 3,506,283, entitled Pedal Construction and Unicycle Incorporating Same.

The principal object of the present invention is to correct the faults of my prior unicycles, and to provide a product that is easy to manufacture, which involves components requiring very little manufacture, and which can be packaged in a disassembled condition and can be easily assembled by the user or by an attendant at a retail outlet.

DISCLOSURE OF THE INVENTION

The unicycle of the present invention is basically characterized by the use of an elongated one piece tie bolt for both securing the wheels together and supporting the pedals. The unicycle comprises a pair of spaced apart wheels and a pair of pedal assemblies which are themselves spaced apart diametrically of the wheels. The tie bolt is of a length slightly longer than the spacing of the two wheels and the length of a pedal. An inboard portion of the tie bolt spans between the two wheels. The pedal is mounted for rotation on an outboard portion of the tie bolt.

In accordance with the invention, a spacer is positioned between the wheels. Preferably this spacer is tubular and surrounds the tie bolt. A second spacer is built into the outboard portion of the tie bolt. This spacer bears at its inner end against an abutment means situated on the outside of the wheel. The tie bolt has a head at one end and at its opposite end is threaded and it threads into a threaded opening provided in the second wheel. The various components are assembled and the tie bolt is tightened. This tightening puts the tie bolt in tension and puts the spacer in compression. The presence of the spacer on the outboard portion of the tie bolt provides a set distance between the head of the tie bolt and the abutment means. A pedal element that is shorter than this distance is mounted for rotation about the outboard spacer. The spacer between the two wheels if tubular has edges at its opposite ends which dig into the inner surfaces of the two wheels when the tie bolt is tightened. This tubular spacer is put into compression and the compression is of such a magnitude that the two wheels are secured together and the position of each to the other is fixed, by the two pedal assemblies.

In accordance with an aspect of the invention, additional tie bolt assemblies may be used between the pedal assemblies. These tie bolt assemblies would be very much like the pedal assemblies. However, the head of the tie bolt bears directly against the abutment means. There is no outboard portion of the tie bolt. In other respects, the assembly is like the wheel assembly.

In accordance with another aspect of the invention, a single large diameter tubular spacer can be used between the two wheels. Such tubular spacer would be of a diameter to surround all of the tie bolts.

A further aspect of the invention involves providing a pair of reinforcement disks which are positioned inwardly adjacent each wheel. The disks are smaller in diameter than the wheels so that they will not contact the ground surface. Thus, their presence does not increase the surface area in contact with the ground and permits easy turning of the unicycle. The spacer tubes in this embodiment extend between the inner faces of the disks.

Yet another aspect of the invention involves the provision of a pair of spacer tubes at the location of each tie bolt. A first tube concentrically surrounds the tie bolt and a second larger diameter tube concentrically surround the inner tube. The lengths of the tubes are selected such that when the tie bolt is tightened, the inner tube will dig more deeply than the outer tube into the inside side surfaces of the wheels. This is done to protect the appearance of the unicycle. The ends of the outer tube do not gall or scar the inner surfaces of the wheels. Such galling or scaring might occur at the ends of the inner tube. However, if it does occur, it is hidden from sight by the outer tube.

Yet another aspect of the invention is to provide a way of constructing plastic rims which can be folded and bundled together for shipment, but which will not experience creases at the folds which cannot be eliminated when the rims are installed on the wheels.

Another aspect of the invention involves the provision of a hand operated counterbalancing device which can be used by a rider to impose a hand directed downward force on the side of the unicycle opposite the downwardly applied foot force on the pedal that is traveling downwardly.

Still another aspect of the invention is to provide a unicycle which has annular outer wheel portions surrounding each side wheel and one-way clutch mechanisms which are operable during pedaling of the unicycle by the rider to effectively connect the outer wheel portions to the wheels as if they were one, so that they are driven by the pedaling action, but disengages the outer wheel portions from the main portions of the wheel when the rider stops pedaling, so that the outer wheel portions can free wheel around the inner wheel portions.

Additional more detailed features of the invention are described below as a part of the description of the best mode.

BRIEF DESCRIPTION OF THE DRAWING

Like reference numerals are used to designate like parts throughout the several views of the drawing, and.

BEST MODE FOR CARRYING OUT THE INVENTION

The unicycle shown by FIG. 1-5 comprises a pair of wheels 10, 12, and a pair of pedal assemblies 14, 16.

Preferably, the wheels 10, 12 are constructed from discs of a wood product board and each is provided with a wear resistant tire 18 at its edge.

Figures 1, 2, 3:
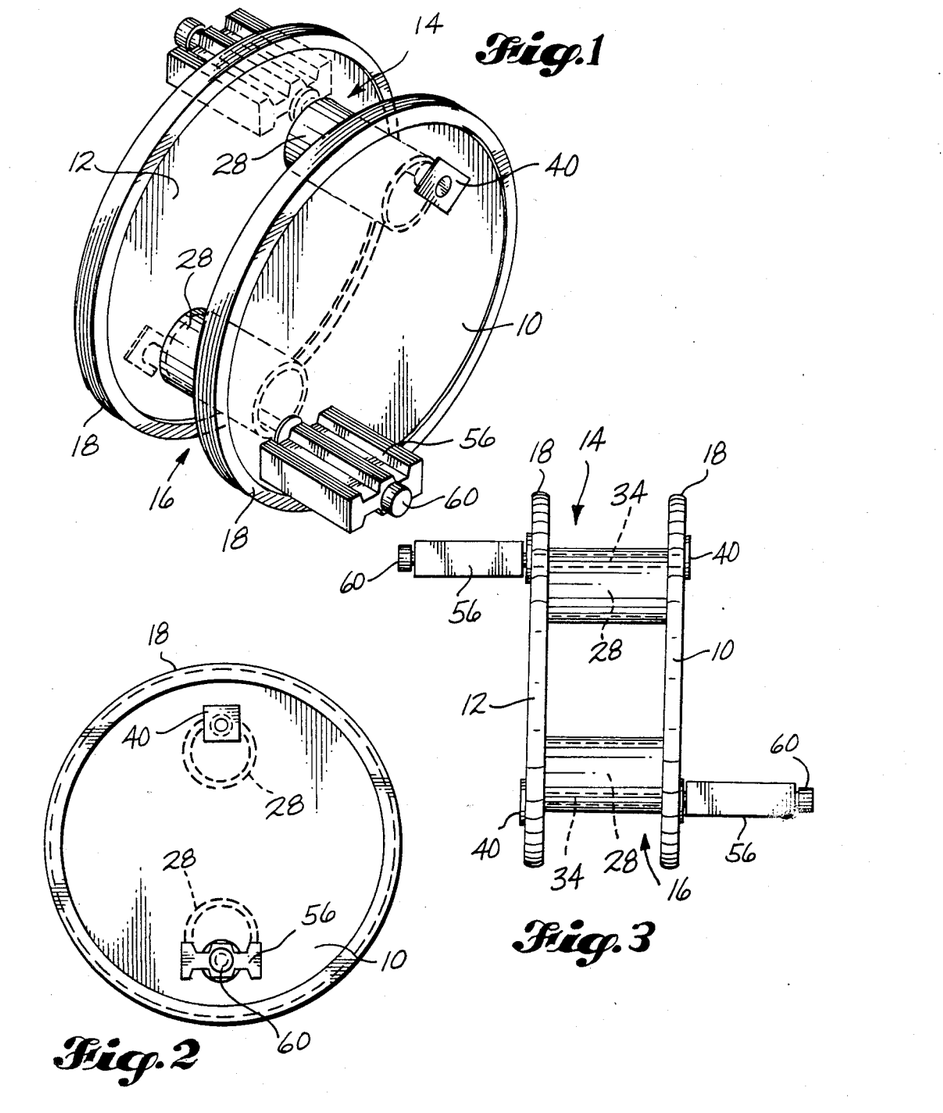
FIG. 1 is an isometric view of a unicycle embodying the present invention, taken from above and looking toward one side and the rims of the wheels.
FIG. 2 is a side elevational view of the unicycle shown by FIG. 1.
FIG. 3 is an end elevation view of the unicycle shown by FIGS. 1 and 2.
Figure 4:
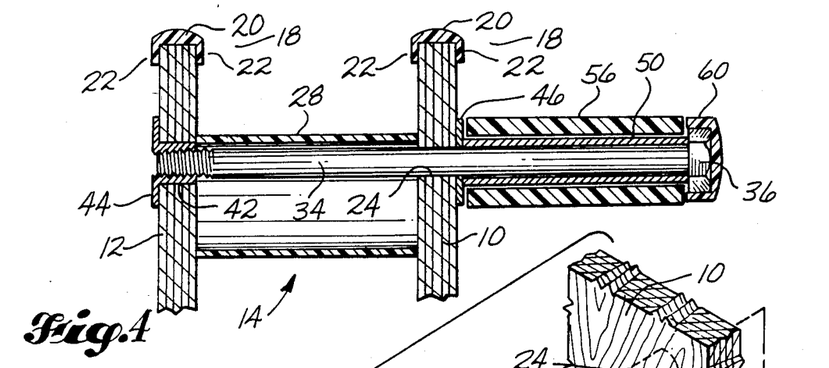
FIG. 4 is a fragmentary sectional view taken through one of the pedal assemblies of the unicycle shown by FIGS. 1-3, with the tie bolt shown in elevation.

As shown by FIG. 4, each tire comprises a tread portion 20 and a pair of sidewalls 22. The tread and sidewalls 20, 22 provides the tire 18 with a C-shaped cross section. The tires can be extruded in strips, then cut to length, and then connected together at their ends to form a tire 18. There are plastic materials available from which the tires 18 can be constructed. Such materials present a tough wear resistant tread 20. They can be extruded into the shape described. When heated, these materials will stretch substantially. When allowed to cool they shrink back to their original size. After the tires 18 have been formed, in the manner described, they can be heated and then stretched over the edges of the wheels 10, 12. Upon cooling, the tires 18 closely conform to the shape of the edges of the wheels 10, 12 and stay secured to the wheels 10, 12.

Figure 5:
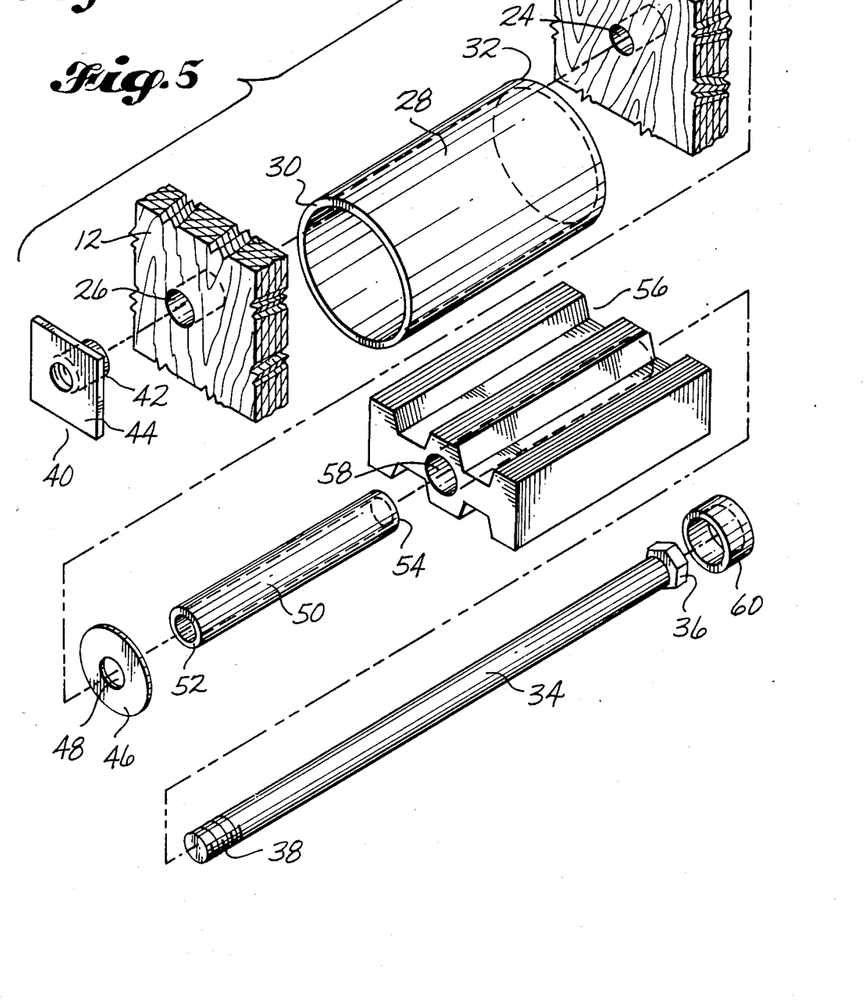
FIG. 5 is an exploded isometric view of the pedal assembly components and fragmentary portions of the wheels.

The pedal assemblies 14, 16 are identical in construction. Therefore only one pedal assembly (14) will be described. Referring to FIGS. 4 and 5, each pedal assembly comprises a first tubular spacer 28 which fits between the wheels 10, 12. In preferred form, the tubular spacer 28 is a length of plastic pipe. It may be the type of plastic pipe used in home plumbing. Regardless of the material, the tubular spacer 28 has an annular wall with edges 30, 32 at its ends. In initial assembly, these edges 30, 32 butt against the inside faces of the wheels 10, 12.

The assembly 14, 16 also comprises an elongated one piece tie bolt 34 having a bolt head 36 at one end and a threaded portion 38 at its opposite end. As shown in FIG. 5, the annular wall has a thickness dimension that is smaller than the tie bolt diameter dimension. Referring to FIG. 5, openings 24, 26 are formed in the wheels 10, 12 at the location of each pedal assembly 14, 16. Wheel 12 includes means providing threads within the opening 26. This can easily be done by the use of a T-nut 40. T-nut 40 comprises an internally threaded tubular portion 42 which projects from a wall 44. Tubular portion 42 fits within the wheel opening 26. Wall 44 bears against the outer surface of wheel 12.

The pedal assembly 14, 16 further comprises an abutment on the outside of the wheel 10. The abutment function could be performed by the portion of the outer surface of the wheel 10 which immediately surrounds the opening 24. However, in preferred form, a washer 46 is provided to serve as the abutment. Washer 46 includes a central opening 48 which is sized to snugly receive the shaft of the bolt 34 (FIG. 4).

Wheel assembly 14, 16 further includes a second tubular spacer 50. This spacer 50 is an enlarged diameter outer end portion of the shaft of the bolt 34. An annular radial shoulder 52 is formed where the enlarged outer end portion of the shaft meets the smaller diameter portion of the shaft. Shoulder 52 contacts the abutment 46.

The pedal member 56 of the pedal assembly 14, 16 is preferably a solid block of moldable plastic, or an equivalent material. It includes an elongated center opening 58 in which the tubular spacer 50 is received.

The unicycle is assembled in the following manner. The two wheels 10, 12, with tires 18 attached, are brought close together. The pedal assemblies are then assembled one at a time. The assembly procedure involves inserting the threaded end portion 38 of the tie bolt 34 first through the tubular spacer 50. The pedal member 56 is installed onto the spacer 50. Then, the threaded end portion 38 of the tie bolt 34 is inserted through the central opening 48 of the abutment 46. Then, the threaded end portion of tie bolt 34 is inserted through the opening 24 in wheel 10. Next, the threaded end portion 38 is inserted through the tubular spacer 28. Lastly, the threaded end portion 38 is threaded into the threaded portion 42 of the T-nut 40. Then, a wrench is used on the bolt head 36, for tightening the bolt 34. The tightening first draws all of the components together, and then puts the tie bolt 34 in tension. Tensioning of the tie bolt 34 puts the spacers 28 in compression. As tightening proceeds, the edges 30, 32 of the tubular spacer 28 dig into the inner surfaces of the wheels 10, 12. The spacer 50 functions to maintain a constant spacing of the bolt head 36 relative to the abutment 46. The spacing of the two wheels 10, 12 can vary in a limited amount, depending on the amount of penetration of the edges 30, 32 into the inner surfaces of the wheels 10, 12.

The pedal element 56 is of a length shorter than the spacer 50. Thus, its ends are not contacted by the abutment 46 or the bolt head 36. It is free to float somewhat lengthwise of the spacer 50. The diameter of the opening 58 is larger than the outside diameter of the spacer 50, so that the pedal element 56 can rotate about the spacer 50.

Following assembly of the components of the pedal assembly in the manner described, a cap 60 of soft plastic or similar material is snapped onto the bolt head 36, to both provide a soft cover and give the outer end of the pedal assembly a decorative appearance. Preferably, the cap 60 is formed to include an inwardly directed lip at its open end which fits inwardly adjacent the inner surface of the head of the bolt 36, 36', so that the cap 60 will be locked in place on the bolt head 36, 36'.

Referring to FIG. 4, in use, the weight of the user applied to the pedal member 56 wants to bend the portion of the tie bolt 34 which projects outwardly from the wheel 10. The tight fit of the tie bolt 34 within the wheel opening 24 stiffens the overhanging outboard portion of the tie bolt 34. The spacers 28, 50 further reinforce the tie bolt 34 against bending. Experimentation with the unicycle has demonstrated a further benefit. It appears that the digging in of the spacer edges into the inner surfaces of the wheel 10, 12 provides the function of a lock washer or lock nut. It appears to stress the loading at the threads in such a way that the tie bolts 34 stays screwed to the 40 during riding of the unicycle.

Figures 8, 9, 10, 11, 12:
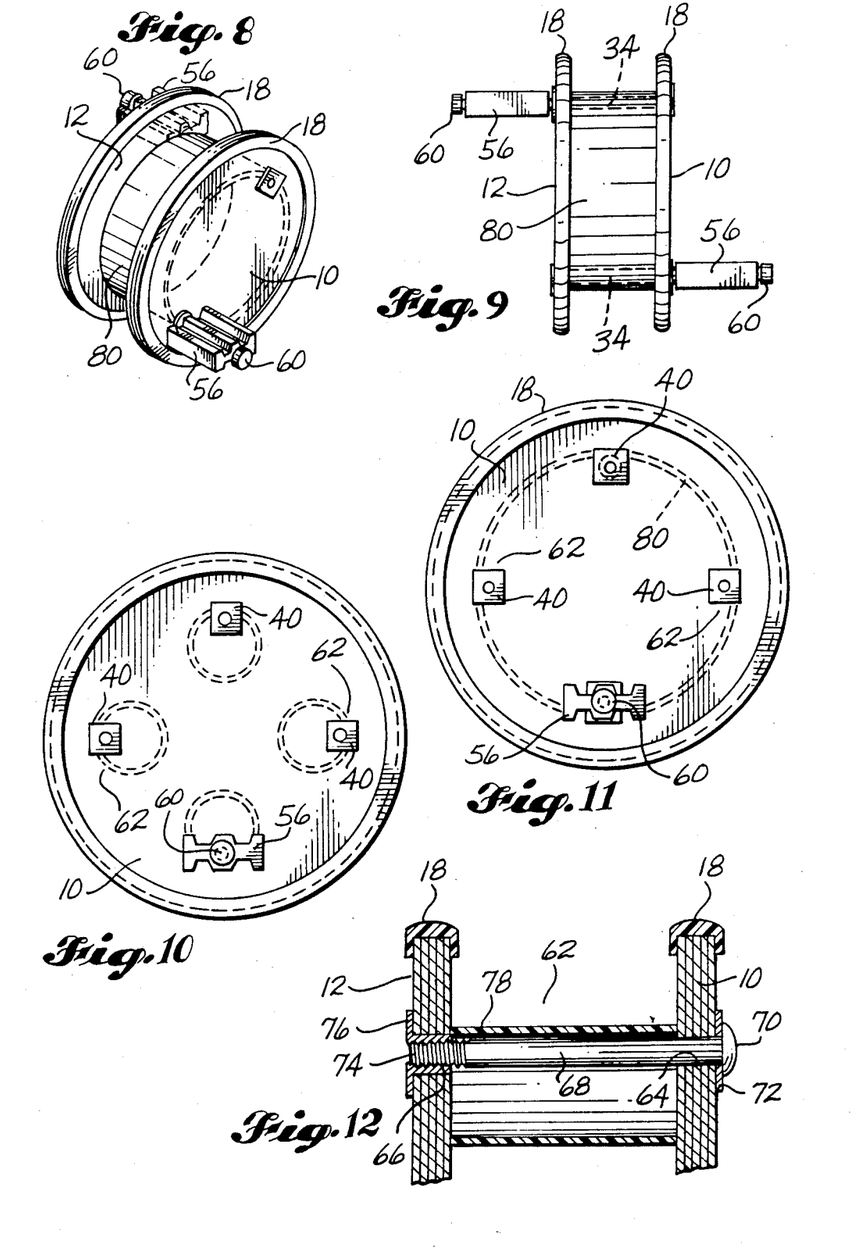
FIG. 8 is a reduced scale isometric view of a second embodiment of the invention.
FIG. 9 is an end elevational view of the embodiment of the invention shown in FIG. 8.
FIG. 10 is a side elevational view of a third embodiment of the invention which is basically like the first embodiment but which includes additional spacers and tie bolts.
FIG. 11 is a side elevational view of a fourth embodiment of the invention which is essentially like the embodiment shown by FIGS. 6 and 7 but which includes additional tie bolts.
FIG. 12 is a fragmentary sectional view showing one of the additional tie bolts.

It may be desirable to construct the unicycle to include some additional tie bolt assemblies extending between the wheels 10, 12. As shown by FIGS. 8 and 9, two additional tie bolt assemblies 62 may be used and they may be spaced apart in the manner illustrated, i.e. diametrically opposite each other and ninety degrees from the pedal assemblies 14, 16. Openings 64, 66 may be provided at the location of each additional tie bolt assembly 62. Opening 64 is sized to snugly receive the shaft of the tie bolt 68. The head 70 of the tie bolt 68 bears against a washer 72 and the washer 72 bears against the wheel 10. The threaded end portion 74 of the tie bolt 68 threads into a T-nut 76. A tubular spacer 78 is located between the wheels 10, 12. When the tie bolt 68 is tightened, it is put into tension and the tubular spacer 78 is put into compression. The edges at the ends of the tubular spacer 78 dig into the inner surfaces of the wheels 10, 12, in the same manner as described before, in connection with tubular spacer 28.

Figure 6:
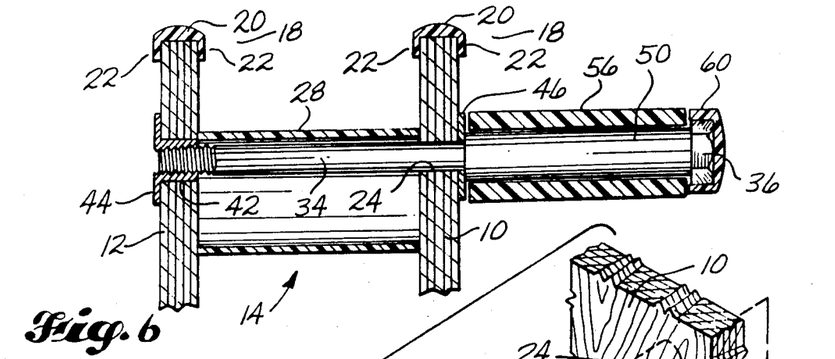
FIG. 6 is a view like FIG. 4, but showing a modified form of tie bolt.
Figure 7:
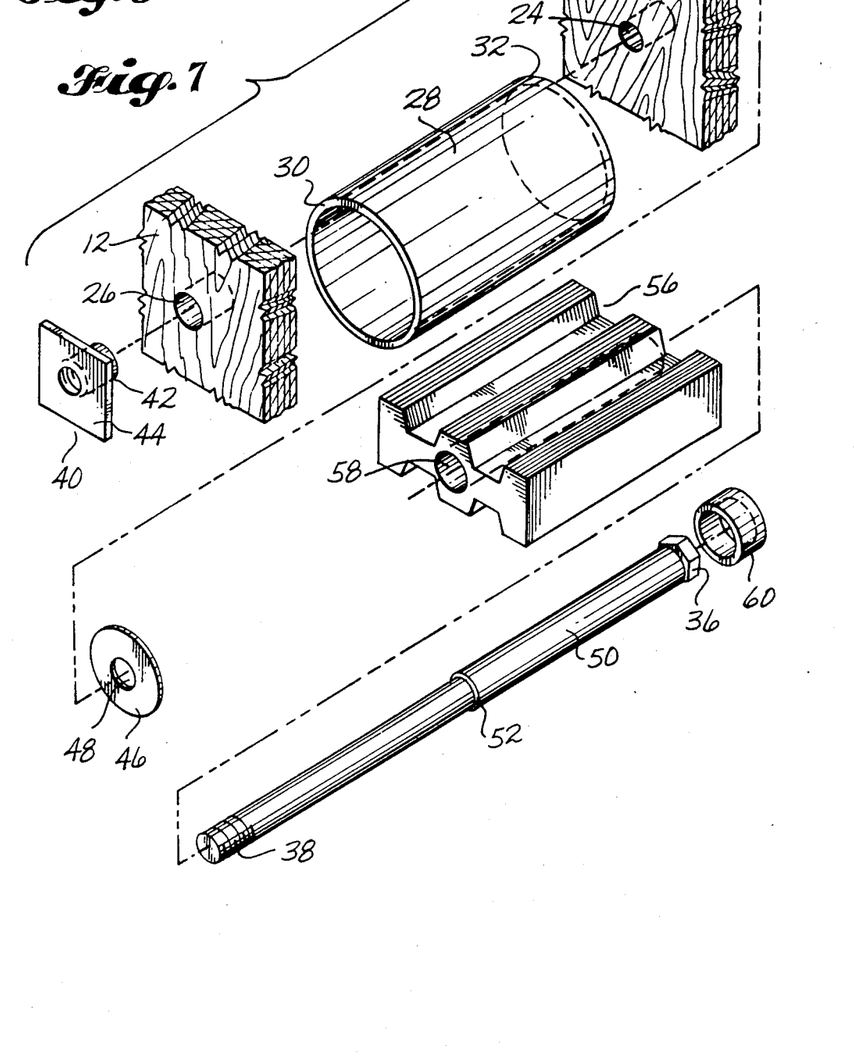
FIG. 7 is a view like FIG. 5, but at the pedal assembly including the modified form of tie bolt.

As shown by FIGS. 6, 7 and 9, a plurality of individual tubular spacers 26 may be replaced by a single tubular spacer 80. Tubular spacer 80 is of such a diameter that it can surround all of the tie bolts. It has edges at its ends which dig into the inner surface of the wheels 10, 12. A unicycle of this construction can be made with only the use of the two pedal assemblies for connecting the wheels 10, 12 together, or the wheels 10, 12 can be connected together by the pedal assemblies aided by additional tie bolt assemblies.

The wheels 10, 12 can be constructed from any suitable material, including metals and plastics.

Preferably, the wheels 10, 12 are constructed from a wood product sheet material. This term is used to include plywood and the various types of composition boards involving sawdust and/or wood chips or flakes.

The width and diameter of the unicycle may vary. However, it is desired that the pedals be relatively close together and that they be positioned relatively close to the rim of the unicycle, so that they are both relatively close to the floor or ground during the riding of the unicycle. In a typical example, the center-to-center spacing of the pedal supporting tie bolts may be six to nine inches. The wheel diameter may be ten to twelve inches. The unicycle width may be five to seven inches. The tubular spacers 28 used in the preferred embodiment may be about two and one half inches in outside diameter. The pedals may be about three and three fourths inchs long, about two and three fourths inches wide, and about one and one-eigth inch thick.

Figure 13:
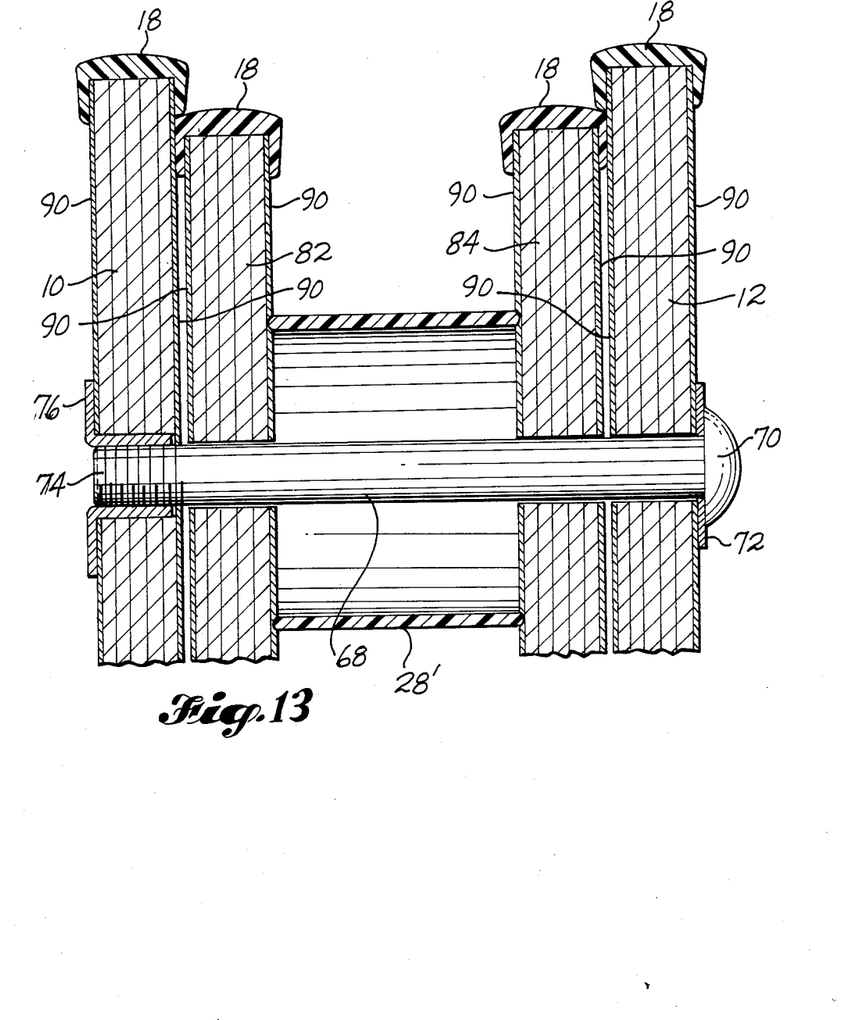
FIG. 13 is a fragmentary sectional view, similar to FIG. 12, showing an embodiment which includes reinforcing disks inwardly adjacent each wheel.

The embodiment shown by FIG. 13 is reinforced by the addition of disks 82, 84. Disk 82 is positioned inwardly adjacent wheel 10. Disk 84 is positioned inwardly adjacent wheel 12. The disks 82, 84 are constructed like the wheels 10, 12 except that they are in smaller diameter. They are preferably provided with tires 18 except these tires 18 mainly serve to enhance the appearance of the peripheries of the disks 82, 84. They give these disks 82, 84 a finished look.

As shown, a shorter length spacer tube 28' is provided at the location of each tie bolt 34, 34', 68. The disks 82, 84 are made smaller in diameter than the wheels 10, 12 so that the width of contact made at the sides of the unicycle is not increased. This makes it easier to turn the unicycle.

The wheels 10, 12 and disks 82, 84 are shown in FIG. 13 to include face layers 90. This may be a thin film of decorative material that is applied by a brush or roller or is sprayed on. Or, they may be thin films that are provided in sheet form and applied to the surfaces of the wheels 10, 12, and disks 82, 84 by use of an adhesive. In this embodiment the tubular spacers 28 are shown at their end penetrating into the surface layer 90.

Figure 14:
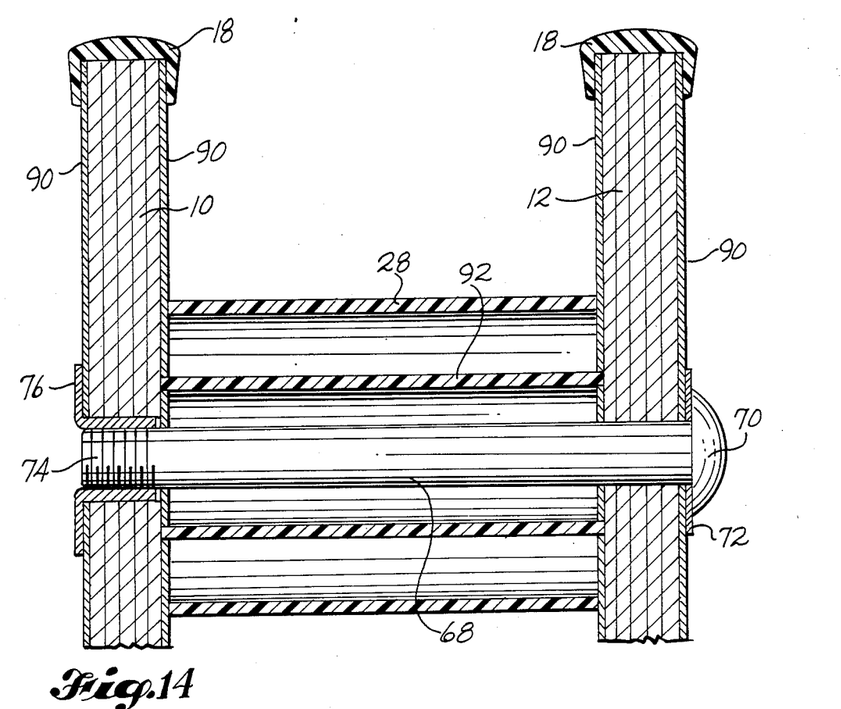
FIG. 14 is a view similar to FIGS. 12 and 13, showing the use of a concentric pair of spacer tubes around each tie bolt.
Figure 15:
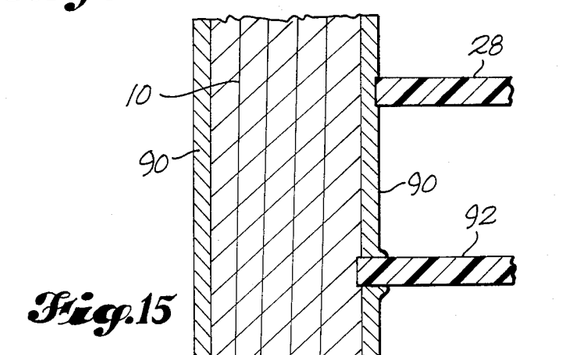
FIG. 15 is an enlarged scale fragmentary view showing the end of the inner spacer tube penetrating deep into the inside surface of the wheel and the end of the outer spacer tube penetrating a lesser amount.
Figure 16:
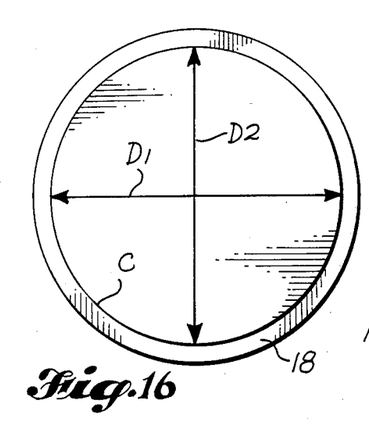
FIG. 16 is an elevational view of a tire prior to its assembly onto a disk wheel.
Figure 17:
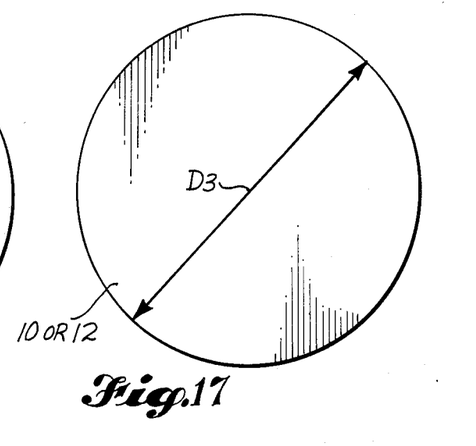
FIG. 17 is a side elevational view of a disk wheel, minus a tire.

The embodiment shown by FIGS. 14 and 15 is a two wheel unicycle. The wheels being designated 10, 12 as before. These wheels are also provided with decorative side surfaces 90. FIG. 14 is a section at a location of one of the tie bolts 68. However, this same arrangement exists at the locations of the pedal carrying tie bolts 34 or 34'.

FIGS. 14 and 15 show the use of a second, inner spacer tube 92, in addition to the outer spacer tube 28. The inner tube 92 may be slightly longer than the outer tube 28. As a result, when the tie bolt and nut assembly 68, 74 (or 34, 44 or 34', 44) is tightened, the tension applied to the tie bolts puts the inner tube 92 in compression to such an extent that at its ends penetrates into and possibly through the decorative surface 90. In the process, the decroative surface 90 might be torn or galled. The outer tube 28 also digs into the decorative surface 90 an amount sufficient to hold it in position. However, since it is shorter, it does not tear or gall the decorative surface 90. This two spacer tube arrangement is particularly useful when the decorative surface 90 is in the form of a sheet of coated paper or thin plastic, or the like. The use of the inner tube 92 prevents the outer tube 28 from spoiling the appearance of the decorative surface 90 at the ends of the outer tube 28.

It is believed that this same protective effect can be obtained by using inner and outer tubes 92, 28 which are essentially equal in length. Since the inner tube 92 is closer to the tie bolt 68 than the outer tube 28, a tightening of the tie bolt 68 would probably cause sufficient deflection in the region of the ends of the inner tube 92 to cause such inner spacer 92 to penetrate into the decorative surface 90 a greater amount than the penetration that would occur at the ends of the outer spacer tube 28. Accordingly, it is only necessary that the two tube lengths be chosen such that, considering the deflection that does occur close to the tie bolt 68, the inner spacer tube 92 will penetrate into the decorative surface 90 an amount greater than the outer space tube 28.

In some installations it may be desired to provide annular grooves in inner surfaces of the wheels 10, 12, to receive the ends of the spacer tubes 28. Or, shallow blind sockets, having a diameter equal to the outside diameter of the tubular spacer 28, may be provided in the wheels' 10, 12 at the end of each spacer 28. The positioning of the ends of the tubular spacers 28 in either the annular grooves or in the shallow sockets would serve to positively lock the spacers in position. It would also provide another way of protecting the decorative surface from galling by the ends of the tubular spacers 28. In such a construction, the ends of the tubular spacers 28 would not butt against the decorative surfaces 90, but rather would fit into the annular groove or the shallow socket.

FIGS. 16–19 relate to a preferred way of constructing and installing the tires 18 for the wheels 10, 12.

Referring to FIG. 11, dimension D1 is an outside diameter of a molded tire 18. Dimension D2 is an inside diameter of the molded tire 18. A comparison of FIG. 11 with FIG. 12 will show that prior to installation, the tire 18 has an outside diameter D1 that is smaller than the diameter D3 of the disk wheels 10, 12.

Figure 18:
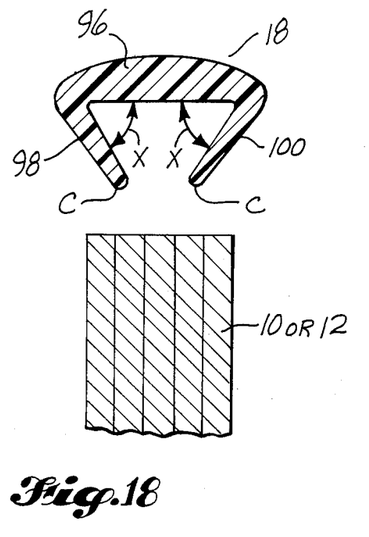
FIG. 18 is a fragmentary sectional view showing a section of the tire spaced radially outwardly from the periphery of the disk.

FIG. 18 shows a preferred cross section of the tire 18, prior to installation on the disk wheel 10 or 12. The tire 18 is of channel form and it includes a web 96, which provides the tread of the tire 18, and a pair of flanges 98, 100 which provide sidewalls. The sidewalls 98, 100 extend at an angle x to the inner surface of the web 20 which is substantially less than 90°.

The tire 18 is constructed as a continuous ring with a cross section of the type shown by FIG. 18. In the usual case, it is shipped from where it is made to where it is assembled onto a wheel 10 or 12. A plurality of the tires 18 are folded and bundled together for shipment. This folding tends to put wrinkles in the flanges 98, 100. The construction of the tire 18 such that the flanges 98, 100 extend at angles less than 90° to the inner surface of the web 96 provides a way of removing these wrinkles so that they are not visible when the tire 18 is installed onto the wheel 10, 12.

Prior to installation, the tire 18 is heated. Heat may be applied in a number of ways. The important thing is that the heat softens the tire material so that the tire 18 can be stretched over and installed onto a peripheral portion of a disk wheel 10, 12. The construction of the tires 18 so that the side flanges 22, 24 converge towards each other, as they extend from the web 20 to the circles C means that in order for the tires 18 to be installed onto the wheels 10, 12 it is necessary to swing the flanges 22, 24 outwardly into positions in which their inner surfaces are substantially perpendicular to the inner surface of the web 20. This movement requires a stretching of all regions of the flanges 22, 24, from their bases where they connect to the web 20 inwardly to the circles C. This stretching removes any wrinkles which might have been put into the material due to a folding and bundling together of the tires 18.

Figure 19:
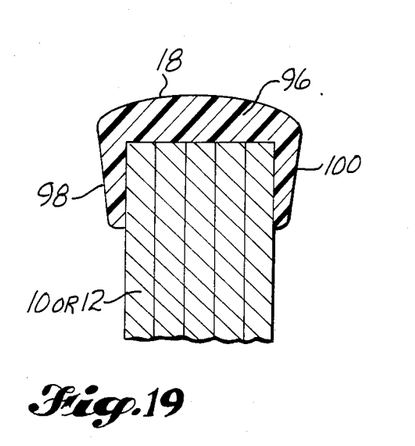
FIG. 19 is a view like FIG. 18, but showing the tire installed on the disk wheel.

FIG. 19 shows the tire 18 properly installed on the peripheral portion of a wheel 10, 12. If the tire 18 were to be molded to include a cross sectional configuration of the shape shown in this figure (i.e. the inner surfaces of the flanges extend perpendicular to the inner surface of the web), the flanges would spread outwardly when the tires 18 are folded and bundled together. This folding would cause a stretching of the material such that the point on the fold that is also on the circle C will have a diameter greater than the diameter of the circle C. When the tire 18 is installed on a wheel 10, 12, there is nothing to cause this point to move inwardly. Hence, the fold remains in the side flanges of the tire 18.

FIGS. 20–23 illustrate two embodiments of a hand operating stabilizing attachment for the unicycle. It comprises an enlongated column 102 having a handle 104 at its upper end and means at its lower end for engaging a portion of the unicycle between the wheels 10, 12. In the embodiments shown by FIGS. 20–22 this means it is in the form of a yoke 106 which is configured to extend about half-way around the circumference of a large diameter spacer tube 80. The yoke 106 may include bearing points 108 which make low frictional contact with the spacer tube 80. The yoke 106, or at least the bearing points 108, may be made from a self-lubricated material, or the like, for minimizing friction.

Figures 20, 21, 22, 23:
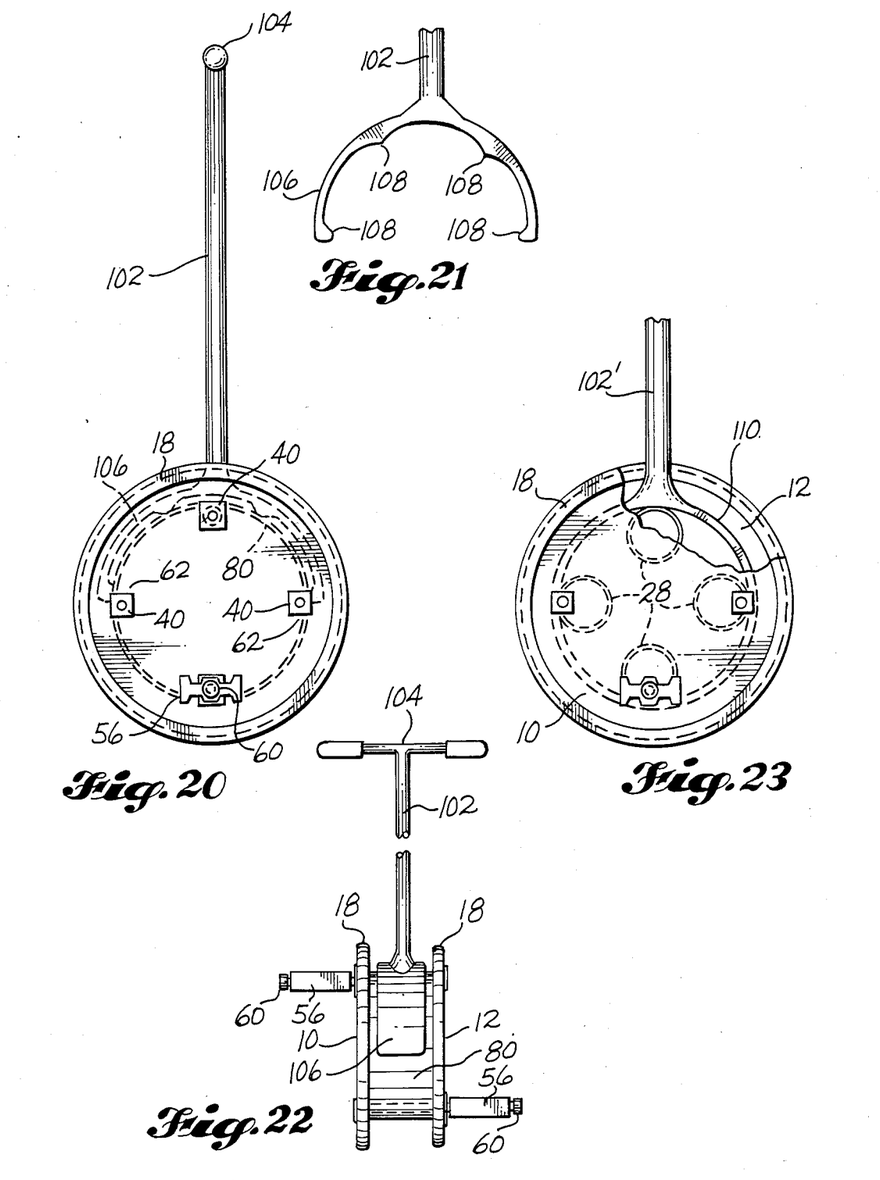
FIG. 20 is a side elevational view of a unicycle and a rider operated counterbalance device.
FIG. 21 is a fragmentary view of a lower end portion of a typical counterbalancing device.
FIG. 22 is an end elevational view, on a reduced scale, of the assembly shown by FIG. 20, with the column broken away intermediate its length.
FIG. 23 is a fragmentary view similar to the lower portion of FIG. 20, showing a modified form of the stabilizing device.

The embodiment shown by FIG. 23 comprises a column 102' having a handle (not shown) at its upper end. Its lower end is in the form of an annular sleeve 110 which surrounds the spacer tubes 28. A similar sort of sleeve could be used with a unicycle having a large diameter spacer tube 80. However, in such an embodiment, the sleeve that is connected to the handle would be larger in diameter so that a radial gap exists between it and the outer surface of the spacer tube 80. Low friction bearing points within project inwardly from such sleeve and make contact with the outer surface of the spacer tube 80. When a person is riding the unicycle he or she is pushing down on one pedal while allowing the other foot to rotate up with the opposite pedal. Thus, the persons weight is more on one side of the unicycle than the other. The stabilizer device allows the lighter to counterbalance the larger foot force that is applied to one side of the unicycle with a hand created force directed towards the opposite side of the unicycle.

Figures 24, 25, 26:
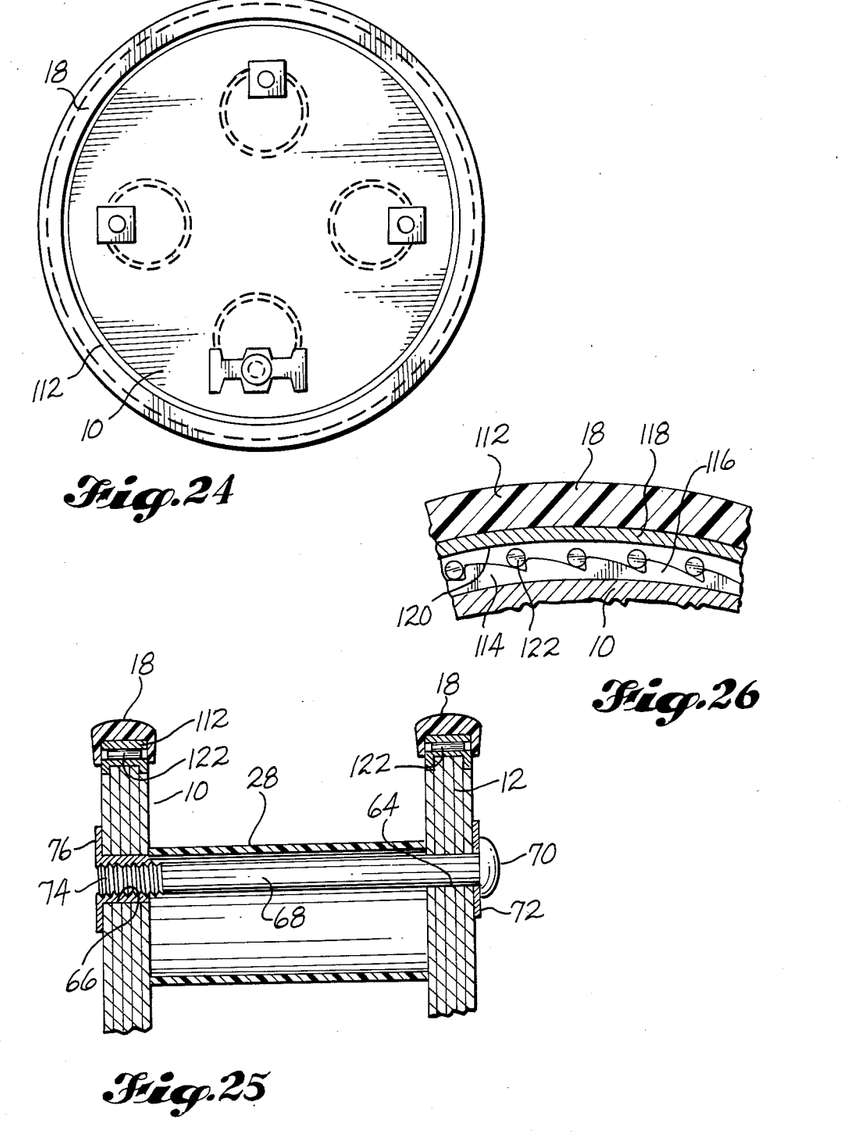
FIG. 24 is a side elevational view of an embodiment which includes an outer rim portion on each wheel which is rotatable relative to the main portion of the wheel.
FIG. 25 is an enlarged scale, fragmentary sectional view, showing the rotatable rims on the disk wheels.
FIG. 26 is a fragmentary sectional view of a portion of a one-way clutch drive between inner and outer races of the outer wheel portion.

FIGS. 24-26 illustrate the basic principles of an embodiment of the unicycle which comprises an annular outer wheel 112 which is mounted onto each of the disk wheels 10, 12. This annular outer wheel 112 may be the outer portion of a unit which is a combination roller bearing and one-way clutch. As shown by FIG. 26, the inner race 114 includes a pluraltiy of ratchet teeth 116. The outer race 118 has a cylindrical inner surface 120. Roller elements 122 are positioned between the races 116, 118. As is well-known per se, in one-way clutch technology, rotation of the race 116 in one direction will force the rollers 122 into drive transmission contact with the outer race 118. This will effectively couple the two races 116, 118 together. However, relative rotation in the opposite direction, will allow the rollers 122 to move into the position shown by FIG. 26. The rollers 126 in this position function as antifriction bearing elements and allow movement of the outer race 118 relative to the inner race 116.

In accordance with an aspect of the inventinon, this type of mechanism, or an equivalent mechanism, is provided on each wheel of the unicycle, with the teeth 116 oriented so that when the rider pedals the unicycle to propel it forward, the rollers 122 are moved into a position engaging the outer race 18. Thus, so long as the rider is pedaling, the outer wheels 112 are secured to the disk wheels 10, 12 and the unicycle functions in the same manner as the earlier described embodiments. However, when the rider stops pedaling, the outer wheels 112 are allowed to free-wheel around the inner wheels 10, 12.

It is to be understood that there are numerous ways in which this type of one-way drive can be provided between the inner portions of the wheels, to which the pedals are connected, and annular outer portions of the wheels. For example, a rack and pawl type mechansim can be employed.

Various other modifications can be made in the construction and design of the unicycle without departing from a use of the present invention. Features of each embodiment may be used in the other embodiments. For example, the decorative surfaces that are described may be used with the embodiments of FIGS. 1-12. In some unicycles nontubular spacers can be used. When tubular spacers are used the cross sectional shape can vary. Circular tubular pipe is readily available and is relatively inexpensive. However, this step is not critical. The examples which are illustrated and described constitute the best mode of the invention but they are still just examples. The scope of protection is not to be limited by these examples, but only by the claims, interpreted by the use of the doctrine of equivalents.

What is claimed is:

1. A unicycle comprising a pair of axially spaced apart disk wheels and a pair of pedal assemblies spaced apart diametrically which also serves to secure the two wheels together and make the unicycle a unitary structure, each said pedal assembly comprising:

an elongated one piece tie bolt having a head at one end, a threaded portion at its opposite end, a pair of aligned bolt receiving openings in the wheels, with the opening in a first of the wheels being sized to snugly receive a midportion of the tie bolt and with the opening in the second wheel being internally threaded to mate with the threads at the end of the tie bolt, a first tubular spacer between the wheels, surrounding the tie bolt, said first tubular spacer comprising an annular wall with inside and outside diameter which are both substantially larger than the tie bolt diameter, said annular wall presenting an edge at each of its ends, said annular wall having a thickness dimension that is smaller than the tie bolt diameter, abutment means axially outwardly of the first wheel surrounding the bolt receiving opening in said wheel, said abutment means including an opening in which the tie bolt is slidably received, said bolt head being spaced axially outwardly from said abutment means, a second tubular spaced closely surrounding the tie bolt between the bolt head and the abutment means, said second tubular spacer extending axially between the bolt head and the abutment means, a pedal separate from said second tubular spacer surrounding said second tubular spacer, said pedal being freely rotatable about said second tubular spacer, and wherein the threads at the end of the bolt are of sufficient length that when the tie bolt is tightened the tie bolt is put into tension, the first tubular spacer is put into compression between the two wheels, and the annular edges at the ends of the first spacer dig into the wheels, and the second tubular spacer is put into compression between the abutment means and the bolt head, and wherein the compression of the two tubular spacers is of such a magnitude that the two wheels are secured together and the position of each to the other is fixed, by the two pedal assemblies.

2. A unicycle according to claim 1, wherein the wheels are circular disks made from a wood product board.

3. A unicycle according to claim 2, wherein the first tubular spacer is a length of plastic pipe.

4. A unicycle according to claim 1, wherein the first tubular spacer is a length of plastic pipe.

5. A unicycle according to claim 1, wherein the pedal is a one piece block and includes a center passageway sized to receive the second spacer, said pedal also extending between the first wheel and the head of the bolt but being shorter than the second tubular spacer so that it is free to rotate.

6. A unicycle according to claim 1, wherein the abutment means comprises a thin annular washer closely surrounding the bolt, said washer making contact with the first wheel and said second tubular spacer making compressive load transferring contact with said washer.

7. A unicycle according to claim 1, comprising at least one additional tie bolt spaced from the pedal assemblies, and a said first tubular spacer surrounding each said additional tie bolt, each said additional tie bolt extending through aligned openings in the wheels and having a head which bears against one of the wheels, a threaded portion at its opposite end, and wherein a nut is carried by the other wheel and to which the threaded end portion of the tie bolt is connected, said additional tie bolt being in tension and putting the said first tubular spacer in compression.

8. The unicycle comprising a pair of axially spaced apart disk wheels and a pair of pedal assemblies spaced apart diametrically which also serve to secure the two wheels together and make the unicycle a unitary structure, each said pedal assembly comprising:
   an elongated one-piece tie bolt having a head at one end and a threaded portion at its opposite end,
   a pair of aligned bolt receiving openings in the wheels, with the opening in the first wheel being sized to snugly receive a mid portion of a tie bolt and with the opening in the second wheel being internally threaded to mate with the threads at the end of the tie bolt;
   a tubular first inner spacer between the wheels, surrounding the tie bolt, said tubular first spacer being substantially larger in diameter than the tie bolt and presenting an edge at each of its ends;
   a second larger diameter tubular outer spacer surrounding the first tubular spacer and presenting an edge at each of its ends;
   said first and second tubular spacers being of such a length that when the tie bolt is tightened and put into tension, the tubular first spacer digs into the inner surfaces of the wheels a greater amount than the ends of the outer tubular spacer.

9. A unicycle comprising a pair of axially spaced apart disk wheels and a pair of pedal assemblies spaced apart diametrically which also serve to secure the two wheels together and make the unicycle a unitary structure, each said pedal assembly comprising:
   an elongated one piece tie bolt having a head at one end, a threaded portion at its opposite end,
   a pair of aligned bolt receiving openings in the wheels, with the opening in a first of the wheels being sized to snugly receive a midportion of the tie bolt and with the opening in the second wheel being internally threaded to mate with the threads at the end of the tie bolt,
   a first spacer between the wheels having means at its ends sized and shaped to dig into the wheels when the tie bolt is in tension,
   abutment means axially outwardly of the first wheel surrounding the bolt receiving opening in said wheel, said abutment means including an opening in which the tie bolt is slidably received,
   said bolt head being spaced axially outwardly from said abutment means,
   a tubular second spacer closely surrounding the tie bolt between the bolt head and the abutment means, said second tubular spacer extending axially between the bolt head and the abutment means,
   a pedal separate from said second tubular spacer surrounding said tubular second spacer, said pedal being freely rotatable about said second tubular spacer, and
   wherein the threads at the end of the bolt are of sufficient length that when the tie bolt is tightened the tie bolt is put into tension, the first spacer is put into compression between the two wheels, and the said means at the ends of the first spacer dig into the wheels, and the tubular second spacer is put into compression between the abutment menas and the bolt head, and wherein the compression of the two tubular spacers is of such a magnitude that the two wheels are secured together and the position of each to the other is fixed, by the two pedal assemblies.

* * * * *